US009807286B2

United States Patent
Kim

(10) Patent No.: US 9,807,286 B2
(45) Date of Patent: Oct. 31, 2017

(54) CAMERA MODULE HAVING A HOUSING AND AN ELECTRONIC CIRCUIT PATTERN LAYER FORMED THEREON

(71) Applicant: LG INNOTEK CO., LTD., Seoul (KR)

(72) Inventor: Hack Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/409,529

(22) PCT Filed: Mar. 28, 2013

(86) PCT No.: PCT/KR2013/002588
§ 371 (c)(1),
(2) Date: Dec. 19, 2014

(87) PCT Pub. No.: WO2013/191359
PCT Pub. Date: Dec. 27, 2013

(65) Prior Publication Data
US 2015/0146073 A1    May 28, 2015

(30) Foreign Application Priority Data

Jun. 22, 2012 (KR) .................. 10-2012-0067327

(51) Int. Cl.
*H04N 5/225* (2006.01)
*G03B 17/02* (2006.01)
(Continued)

(52) U.S. Cl.
CPC ............ *H04N 5/2254* (2013.01); *G03B 9/08* (2013.01); *G03B 13/36* (2013.01); *G03B 17/02* (2013.01);
(Continued)

(58) Field of Classification Search
CPC ............... H04N 5/2257; H04N 5/2254; H04N 5/23212; H04N 5/369
(Continued)

(56) References Cited

U.S. PATENT DOCUMENTS 8,411,193 B2 * 4/2013 Chiu .................... G02F 1/29
348/335
8,878,976 B2 * 11/2014 Du ..................... H04N 5/2251
348/335

(Continued)

FOREIGN PATENT DOCUMENTS

JP       2011-112712 A    6/2011
KR    10-2011-0072214 A   6/2011
(Continued)

OTHER PUBLICATIONS

International Search Report dated Jun. 26, 2013 issued in Application No. PCT/KR2013/002588.
(Continued)

*Primary Examiner* — Antoinette Spinks
(74) *Attorney, Agent, or Firm* — Ked & Associates, LLP

(57) ABSTRACT

An exemplary embodiment of the present invention includes a PCB (Printed Circuit Board) mounted with an image sensor, a housing arranged on an upper surface of the PCB and including therein at least one or more lenses, an actuator positioned on the housing, and an electronic circuit pattern layer formed at an non-exposed surface of the housing.

19 Claims, 3 Drawing Sheets

(51) Int. Cl.
    *G03B 9/08*     (2006.01)
    *G03B 13/36*    (2006.01)
    *H04N 5/232*    (2006.01)
    *H04N 5/369*    (2011.01)

(52) U.S. Cl.
    CPC ....... *H04N 5/2257* (2013.01); *H04N 5/23212* (2013.01); *H04N 5/369* (2013.01)

(58) Field of Classification Search
    USPC .......................................... 348/308, 373, 335
    See application file for complete search history.

(56) References Cited

U.S. PATENT DOCUMENTS

| | | |
|---|---|---|
| 2010/0033616 A1 | 2/2010 | Huang et al. |
| 2011/0134303 A1 | 6/2011 | Jung et al. ................... 348/340 |
| 2012/0140101 A1* | 6/2012 | Afshari ............... H04N 5/2257 348/308 |
| 2012/0315953 A1* | 12/2012 | Du ....................... H04N 5/2257 455/556.1 |

FOREIGN PATENT DOCUMENTS

| | | |
|---|---|---|
| KR | 10-2011-0127922 A | 11/2011 |
| KR | 10-1138513 B1 | 4/2012 |
| TW | 201103137 | 1/2011 |
| TW | 201122704 | 7/2011 |

OTHER PUBLICATIONS

Taiwanese Office Action dated Jun. 20, 2016 issued in Application No. 1052074655001.

* cited by examiner

CAMERA MODULE HAVING A HOUSING AND AN ELECTRONIC CIRCUIT PATTERN LAYER FORMED THEREON

CROSS-REFERENCE TO RELATED PATENT APPLICATIONS

This application is a U.S National Stage Application under 35 U.S.C. §371 of PCT Application No. PCT/KR2013/002588, filed Mar. 28, 2013, which claims priority to Korean Patent Application No. 10-2012-0067327, filed Jun. 22, 2012, whose entire disclosures are hereby incorporated by reference.

TECHNICAL FIELD

The teachings in accordance with exemplary and non-limiting embodiments of this invention relate generally to a camera module.

BACKGROUND ART

A PCB (Printed Circuit Board) is one of parts capable of supplying a control signal and a power by connecting electric circuits among the electronic parts. Recently, a camera module has been developed that is capable of performing an auto focusing operation using an actuator. In order to drive an actuator, the actuator may be controlled by conductibly connecting an AF (Auto Focus) Terminal (positive pole) and a PCB auto focus pad.

The actuator needs to receive a control signal and a power by being connected to a PCB mounted with an image sensor, and to this end, a separate connection board performing a wiring function is generally provided for being interposed between the actuator and the PCB.

However, in a case the connection board is separately provided, the connection board must be manufactured to thereby cause cumbersomeness in controlling inventory, whereby a camera module is disadvantageously increased in size as much as the size of the connection board.

DISCLOSURE

Technical Problem

Accordingly, it is an object of the present invention to provide a camera module improved in structure by configuring an electronic circuit on a surface of a part free from a separate PCB when the electronic part is injection molded.

Technical Solution

In order to accomplish the above object, in one general aspect of the present invention, there is provided a camera module, the camera module comprising: a PCB (Printed Circuit Board) mounted with an image sensor; a housing arranged on an upper surface of the PCB and including therein at least one or more lenses; an actuator positioned on the housing; and an electronic circuit pattern layer formed at an non-exposed surface of the housing.

Preferably, but not necessarily, the housing may include a lens holder arranged therein with at least one or more lenses.

Preferably, but not necessarily, the electronic circuit pattern layer may be formed at the lens holder.

Preferably, but not necessarily, the electronic circuit pattern layer may be formed a surface opposite to the lens holder arranged at an inner surface of the housing.

Preferably, but not necessarily, the housing may be directly installed thereinside with at least one or more lenses.

Preferably, but not necessarily, the electronic circuit pattern layer may be formed a surface opposite to the lens arranged at an inner surface of the housing.

Preferably, but not necessarily, the electronic circuit pattern layer may be connected to a terminal unit of the PCB.

Preferably, but not necessarily, the electronic circuit pattern layer may be connected to an actuator terminal.

Preferably, but not necessarily, the electronic circuit pattern layer may be connected at one end to the actuator terminal, and the other end to the terminal unit of the PCB.

Preferably, but not necessarily, the actuator may be formed with at least two or more connection terminals.

Preferably, but not necessarily, one connection terminal may be connected to a plus terminal and another connection terminal may be connected to a ground terminal.

Preferably, but not necessarily, the connection terminal may be conductibly connected to the electronic circuit pattern layer by any one of a soldering, a wire bonding, a conductive epoxy bonding and a direction connection method.

Preferably, but not necessarily, the terminal unit of the PCB may be conductibly connected to the electronic circuit pattern layer by any one of a soldering, a wire bonding, a conductive epoxy bonding and a direction connection method.

Preferably, but not necessarily, the actuator may perform any one function of an auto focusing function, a handshake prevention function, a shutter function, and a zoom function.

Preferably, but not necessarily, the actuator may adjust a focus of an image captured by the image sensor by adjusting a refractive index of light passing through the lenses.

Preferably, but not necessarily, the actuator may include any one of a micro actuator, a liquid crystal lens, a non-micro actuator like a piezoelectric polymer lens, a silicon type actuator, and a liquid lens.

Advantageous Effects

A camera module according to the present invention has an advantageous effect in that an electronic part can be manufactured at a low cost by forming an electronic circuit pattern layer on a surface of the electronic part, that is, by forming an electronic circuit on a surface of the injection-molded electronic part.

Another advantageous effect is that a product of a highly predetermined level of reliability can be manufactured to reduce a processing cost regardless of workers' workability, due to decreased level of difficulty in the manufacturing process.

BEST MODE

Now, the camera module according to exemplary embodiments of the present invention will be described in detail with reference to the accompanying drawings.

Figure 1:
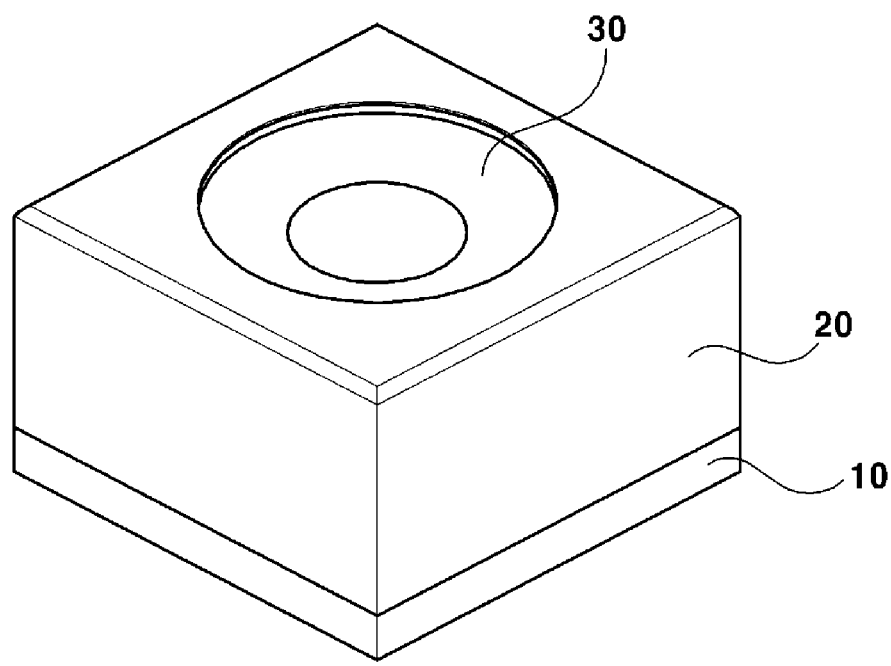
FIG. 1 is a schematic perspective view illustrating a camera module according to an exemplary embodiment of the present invention.
Figure 2:
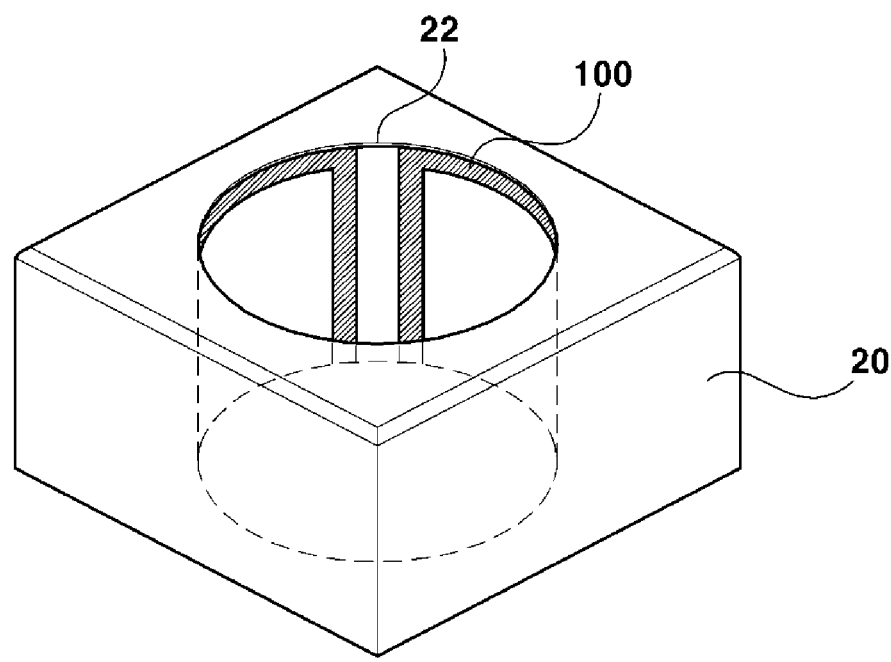
FIG. 2 is a schematic perspective view illustrating a PCB of FIG. 1.
Figure 3:
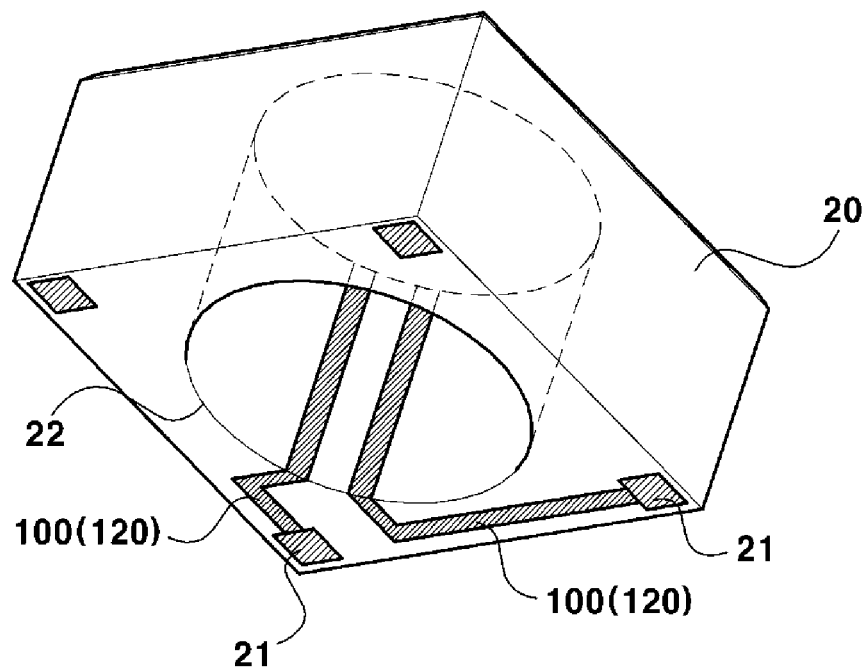
FIGS. 3 and 4 are respectively a perspective view and a bottom perspective view illustrating a holder member of FIG. 1.
Figure 4:
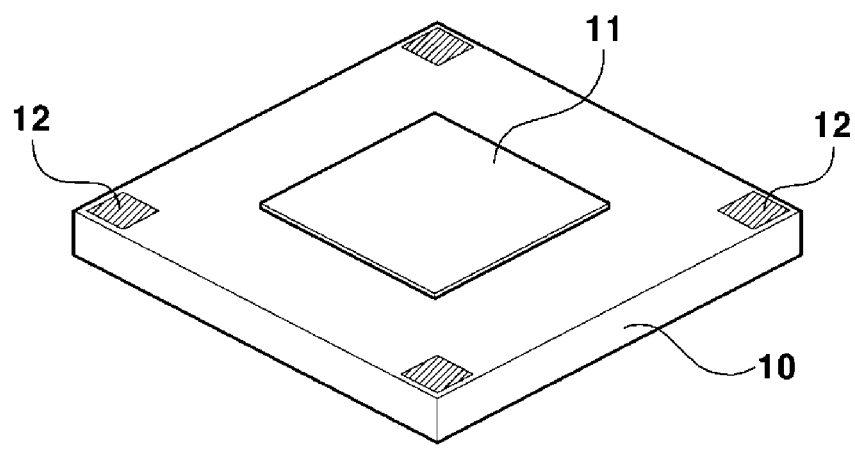
Figure 5:
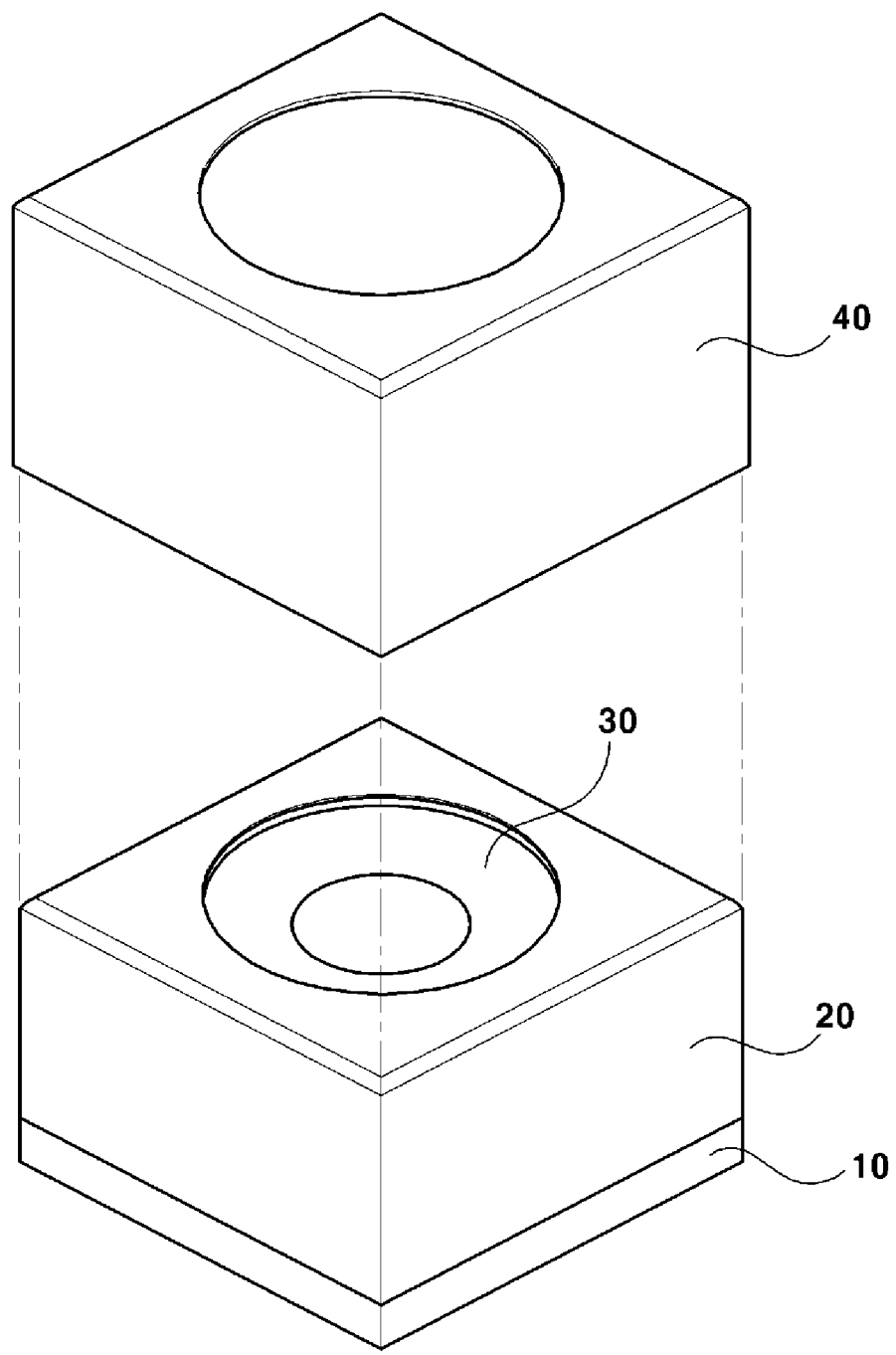
FIG. 5 is an exploded perspective view illustrating a camera module according to another exemplary embodiment of the present invention.

FIG. 1 is a schematic perspective view illustrating a camera module according to an exemplary embodiment of the present invention, FIG. 2 is a schematic perspective view illustrating a PCB of FIG. 1, FIGS. 3 and 4 are respectively a perspective view and a bottom perspective view illustrating a holder member of FIG. 1, FIG. 5 is an exploded perspective view illustrating a camera module according to another exemplary embodiment of the present invention.

Referring to FIGS. 1 to 4, a camera module according to an exemplary embodiment of the present invention may include a PCB (10), a housing (20), an actuator (30), an electronic circuit pattern layer (100) formed at an inner surface of the housing (20).

Referring to FIG. 2, an image sensor (11) may be installed at an approximately central vicinity of the PCB (10), and a plurality of terminal units (12) may be formed on the PCB (10). The terminal unit (12) is formed at a surface opposite to the housing (20) stacked at an upper surface of the PCB (10), and is provided to correspond to a holder terminal unit (21), where in a case the housing (20) is coupled to the upper surface of the PCB (10), the terminal unit (12) and the holder terminal unit (21) may be conductibly connected.

The PCB (10) may be mounted thereon with various electronic parts in addition to the image sensor (11), and may be formed with materials such as FR-4 (woven glass and epoxy), FR-5 (woven glass and epoxy) and ceramic materials. The terminal unit (12) is preferably connected to the holder terminal unit (21) via a soldering. However, the present invention is not limited thereto, and wire bonding, AG epoxy bonding, or conductive epoxy may be used for connection, and a physical direct connection is also possible.

The housing (20) may be arranged at an upper surface of the PCB (10) and may include at least one or more sheets of lenses. As illustrated in FIGS. 3 and 4, the housing (20) may be centrally formed with a space unit (22) mountable with a lens holder for mounting the lenses. The space unit (22) may be provided in a shape corresponding to that of the lens holder. According to an exemplary embodiment of the present invention, the space unit (22) may be provided in a shape of a cylinder. The housing (20) may include at least one or more impurities, and may be injection-molded with a material deformable in physical properties when applied with any one of at least one or more of heat and light. The housing (20) may be integrally configured in one body with a base installed with an IFCF (Infrared Cut Filter), if necessary.

The housing (20) may take a shape of a cube having a cylindrical space unit (22). However, the present invention is not limited thereto, and the shape of the housing (20) may be changed depending on the shape and size of the lens holder. By way of non-limiting example, in a case lenses, each having a different diameter, are installed depending on a difference of magnification of lens mounted on the lens holder, the housing (20) may be formed in the shape of a multistage lens holder each stage having a different diameter depending on respective lens diameters.

The electronic circuit pattern layer (100) may be formed on a non-exposed surface of the housing (20).

According to an exemplary embodiment of the present invention, the electronic circuit pattern layer (100) may be formed on the lens holder, on a surface opposite to the lens holder, or on a surface opposite to the lens of the housing (20) in a case the housing (20) is directly installed with at least one or more lenses.

Referring to FIGS. 3 and 4, according to an exemplary embodiment of the present invention, the electronic circuit pattern layer (100) may be formed on a surface of the space unit (22) which is a non-exposed surface provided inside the housing (20) useable as a barrel of the camera module or a camera housing. At this time, the electronic circuit pattern layer (100) is not exposed outside of the housing (20) when camera module is completed in assembly, because the electronic circuit pattern layer (100) is formed at a position installed with a plurality of lenses or the lens holder as an inner space of the housing (20).

Furthermore, according to another exemplary embodiment of the present invention, the electronic circuit pattern layer (100) may be formed on the surface of the lens holder mounted with the space unit (22) or inside the lens holder, and in this case, the electronic circuit pattern layer (100) is not exposed outside of the housing (20), detailed description of which will be explained again later.

Referring to FIG. 1, the actuator (30) may be positioned at an inner surface of the housing (20) to be added with a focus adjusting function for the camera module. The actuator (30) may be arranged at an upper surface or a bottom surface of the housing (20), although not illustrated. However, the installation position of the actuator (30) is not limited to the abovementioned structure, and may be changed as allowed by the design within a permissible scope.

A terminal unit (not shown) of the actuator (30) may be conductibly connected to the electronic circuit pattern layer (100) formed with the housing (20) or the lens holder, where the electronic circuit pattern layer (100) may be conductibly connected to the terminal unit of the PCB (10). The electronic circuit pattern layer (100) may receive a power or a control signal from a conductive layer (120, see FIG. 3) of metal material, in a case the conductive layer (120) is provided at an upper surface of the electronic circuit pattern layer (100).

The actuator (30) may be used in various forms in response to device needs, and may be formed and used in any one of a piezoelectric/polymer lens, an optical diaphragm, a liquid crystal micro lens, a micro actuator, a micro piezoelectric actuator, a micro bimorph actuator, an micro thermal actuator, a micro magnetic actuator, a micro liquid actuator, a non-micro type actuator, a silicon type actuator, and a liquid lens, or any type of actuator that is configured by combination thereof.

Furthermore, the actuator (30) may perform auto focusing function of an image captured by the image sensor, a handshake prevention function, a shutter function and a zoom function using at least one or more lenses. Meanwhile, the actuator (30) may be provided with at least two or more connection terminals for connection with a plus terminal and a ground terminal, where the connection terminal may be connected to the electronic circuit pattern layer (100) via soldering, wire bonding and Ag epoxy.

A plurality of connection terminals including at least two or more connection terminals may be formed, where one of the connection terminals may be connected to the plus terminal, while another connection terminal may be connected to the ground terminal. The actuator (30) is susceptible to shakes during optical axis alignment and lens actuation and therefore needs to be tightly fixed to the lens holder supporting the lens by being provided at the housing (20), such that the connection terminals are preferably connected using soldering or wire bonding, if possible. Furthermore, a signal exchange with the actuator (30) must be also performed through the electronic circuit pattern layer (100), it is possible to manufacture a product with inexpensive cost due to elimination of cumbersomeness of using a complex wiring or installing a separate board such as a PCB or a separate FPCB by manufacturing the separate PCB or FPCB for signal exchange.

Meanwhile, a technology for forming the electronic circuit pattern layer (100) is called a surface conductive pattern forming technology, which may be largely categorized into three types.

First of all, a first method is called a patterning method through dual forming, where a part forming the housing (20) and a part forming the electronic circuit pattern layer (100) are injection molded using mutually different synthetic resins, that is, the housing (20) is injection molded using an insulation material, while the part for forming the electronic circuit pattern layer (100) is injection molded with metal plating-easy synthetic resin, the housing (20) is injection molded and the electronic circuit pattern layer (100) is completed by using a post processing such as plating.

The second method is such that the housing (20) is injection molded with impurities reactive to heat and light included, and a wiring pattern is formed on a part where the electronic circuit pattern layer (100) is to be formed via a surface patterning process to the injection-molded housing (20) such as laser lithography. That is, the housing (20) according to an exemplary embodiment of the present invention, as explained above, is injection-molded with a material changeable in physical properties if applied with at least one of heat or light by including at least one or more impurities.

The housing (20) thus injection molded with a material including impurities, if exposed to light by means capable of transmitting light such as laser beam and/or heat, is changed in physical properties at a part where the light is received. That is, if a laser beam (L) is incident to expose a surface of a body by light and/or heat, the physical properties on the surface portion of the housing (20) thus exposed by the laser beam (L) are changed under the influence of the impurities. This is because the impurities included in the housing (20) are evaporated or sublimated by laser beam (L) and heat to change surrounding materials. The impurities may change the physical properties at the exposed part of the housing (20) to a conductible state or to physical properties easy to be coated or plated albeit being in-conductible. Composition of the impurities and exposing process are well known to the skilled in the art, being less relevant to the present invention, are omitted in further details.

Thus, the electronic circuit pattern layer (100) may be formed on the part exposed by the laser beam (L) using the changing physical properties on the surface of the housing (20), as illustrated in the figures. That is, in a case the laser beam (L) is irradiated on the surface of the housing (20) in the shape of an electronic circuit pattern, the surface of the housing (20) exposed by the laser beam (L) may be formed or written with the electronic circuit pattern layer (100) having the electronic circuit pattern albeit being invisible.

In a case the electronic circuit pattern layer (100) is formed, the electronic circuit pattern layer (100) per se being conductible may be directly mounted with SMDs (Surface Mounted Devices) or accessory electronic parts. Furthermore, a conductible material of metal layer (not shown) may be additionally formed by lamination using the metal material on the surface of the electronic circuit pattern layer (100). That is, the electronic circuit pattern layer (100) may be formed by plating the metal material, or configured by coating a conductible material on the surface.

Meanwhile, the third method as another technology is a method in which an entire surface is metalized, and a non-circuit part is etched and patterned. That is, an entire surface of the housing (20) is metalized, leaving a part to be formed with the electronic circuit pattern layer (100), a remaining part is etched and the electronic circuit pattern layer (100) is formed on the housing (20).

Meanwhile, the electronic circuit pattern layer (100) provided by the technology according to the exemplary embodiment of the present invention is characterized by formation of the electronic circuit pattern layer (100) on an inner surface invisible from outside of the housing (20). This is to prevent an erroneous operation by interference, because, if the electronic circuit pattern layer (100) is exposed outside of the housing (20), the camera module may develop an erroneous operation by interference with a metal material of shield can installed for shielding the EMI (Electromagnetic Interference).

Although not illustrated, it is also possible to form an electronic circuit pattern layer (100) on a surface outside of the lens holder installed inside the housing (20). In this case, the electronic circuit pattern layer (100) is not exposed to outside of the housing (20) to have a same effect as that of the abovementioned exemplary embodiment because the electronic circuit pattern layer (100) is arranged at an inner surface centrally formed at the housing (20).

According to the exemplary embodiment of the present invention, there is no need of providing an insulation measure between the electronic circuit pattern layer (100) and an electromagnetic interference shield member, because the electronic circuit pattern layer (100) is formed at an unexposed inner surface of the housing (40) of insulation material or at a surface of the lens holder, whereby the camera module can be miniaturized, because the shape of the electromagnetic interference shield member can be configured to correspond to that of the housing (20), and the electromagnetic interference shield member can be tightly brought into contact with the housing (20).

Meanwhile, it is also possible to form the electronic circuit pattern layer (100) on an exposed outer surface of the housing (20), and in this case, it is preferable that a sufficient distance be provided or an insulation material be arranged at a space unit with the electromagnetic interference shield member, in view of the fact that material for the electromagnetic interference shield member installed to wrap the housing (20) and to shield the electromagnetic wave inputted into or outputted from the camera module is a conductive part such as a metal.

Although FIG. 1 has illustrated and explained the housing (20) that forms an exterior look of the camera module free from a separate shield member, it is also possible to provide a configuration with the housing (20) that is installed with a separate shield can (40) as illustrated in FIG. 5. This is because it is possible to assemble the camera module without worry of short-circuit, even if the shield can (40) of metal material is coupled thereto, as the unexposed inner surface of the housing (20) is formed with the electronic circuit pattern layer (100), as explained above.

Although not illustrated, in addition to the camera module exemplified above, it is also possible to integrally form an electronic circuit pattern layer on bodies of other types of electronic parts connected to an injection-molded PCB. In this case, it is possible to directly arrange and couple the SMDs or electronic parts to circuit pattern formed on the injection molded body. If the electronic parts are configured thus explained, there is no need of separately manufacturing or coupling PCBs to dispense with such troubles as coupling of the PCBs to bodies of electronic parts and connection using wiring, whereby the number of parts can be decreased to reduce the manufacturing cost.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to exemplary embodiments of the present invention is applicable to a small-sized camera module used for a small-sized portable electronic parts, and may be a useful technique where a space for wiring is small and needs electrical connection with a plurality of parts.

The invention claimed is:

1. A camera module, the camera module comprising:
a PCB (Printed Circuit Board) comprising a first terminal unit disposed on an upper surface of the PCB;
a housing disposed on the upper surface of the PCB and comprising an inner circular cylindrical surface forming a lens accommodating portion accommodating at least one lens and a bottom surface being in contact with the upper surface of the PCB;
an actuator coupled with the housing and comprising an outer circular cylindrical surface in contact with the inner circular cylindrical surface of the housing;
an electronic circuit pattern layer electrically connected to the first terminal unit of the PCB and the actuator; and
a metal material of shield can covering the housing,
wherein the electronic circuit pattern layer comprises a first electric line formed along the inner circular cylindrical surface of the housing and a second electric line formed along the bottom surface of the housing,
wherein the first electric line comprises a first portion horizontally extending along the inner circular cylindrical surface of the housing and a second portion connecting the first portion and the second electric line,
wherein the first portion of the first electric line lies at right angles to the second portion of the first electric line,
wherein the outer circular cylindrical surface of the actuator faces the first portion of the first electric line formed on the inner circular cylindrical surface of the housing,
wherein an actuator terminal of the actuator is connected to a portion of the first portion,
wherein the second electric line comprises a second terminal unit being in contact with the first terminal unit of the PCB, a third portion extending from the second terminal unit, and a fourth portion connecting the first electric line and the third portion of the second electric line, and
wherein the fourth portion of the second electric line lies at right angles to the third portion of the second electric line.

2. The camera module of claim 1, wherein the housing comprises a lens holder arranged therein with at least one lens.

3. The camera module of claim 2, wherein the electronic circuit pattern layer is formed on the inner surface of the housing facing the lens holder.

4. The camera module of claim 1, wherein the housing is directly disposed thereinside with at least one lens.

5. The camera module of claim 4, wherein the electronic circuit pattern layer is formed on the inner circular cylindrical surface of the housing facing the lens.

6. The camera module of claim 1, wherein the electronic circuit pattern layer is connected at a first end to the actuator, and is connected at a second end to the first terminal unit of the PCB.

7. The camera module of claim 1, wherein the actuator comprises at least two connection terminals.

8. The camera module of claim 7, wherein one connection terminal is connected to a plus terminal and another connection terminal is connected to a ground terminal.

9. The camera module of claim 1, wherein the actuator terminal is connected to the first portion of the first electric line by any one of a soldering, a wire bonding, a conductive epoxy bonding and a direction connection method.

10. The camera module of claim 1, wherein the first terminal unit of the PCB is conductibly connected to the electronic circuit pattern layer by any one of a soldering, a wire bonding, a conductive epoxy bonding and a direction connection method.

11. The camera module of claim 1, wherein the actuator performs any one function of an auto focusing function, a handshake prevention function, a shutter function, and a zoom function.

12. The camera module of claim 1, wherein the actuator adjusts a focus of an image captured by the image sensor by adjusting a refractive index of light passing through the lenses.

13. The camera module of claim 1, wherein the actuator comprises any one of a micro actuator, a liquid crystal lens, a non-micro actuator like a piezoelectric polymer lens, a silicon type actuator, and a liquid lens.

14. The camera module of claim 1, wherein the shield can is configured to shield the EMI (Electromagnetic Interference).

15. The camera module of claim 1, wherein the first portion of the first electric line comprises a first part and a second part extended opposite to the first part and spaced from the first part.

16. The camera module of claim 1, wherein the first portion is disposed on an upper end of the inner surface of the housing.

17. The camera module of claim 2, wherein the second portion of the electronic circuit pattern layer faces the lens holder.

18. The camera module of claim 1, wherein the electronic circuit pattern layer is not disposed on an upper surface of the housing.

19. The camera module of claim 1, wherein a length of the first portion extending horizontally extending along the inner circular cylindrical surface of the housing is greater than a horizontal width of the second portion of the first electric line.

* * * * *